(12) United States Patent
Herberger

(10) Patent No.: US 11,732,777 B2
(45) Date of Patent: Aug. 22, 2023

(54) GEARED MOTOR

(71) Applicant: SEW-EURODRIVE GMBH & CO. KG, Bruchsal (DE)

(72) Inventor: Michael Josef Herberger, St. Leon-Rot (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 122 days.

(21) Appl. No.: 17/424,336

(22) PCT Filed: Jan. 13, 2020

(86) PCT No.: PCT/EP2020/025007
§ 371 (c)(1),
(2) Date: Jul. 20, 2021

(87) PCT Pub. No.: WO2020/151911
PCT Pub. Date: Jul. 30, 2020

(65) Prior Publication Data
US 2022/0090653 A1    Mar. 24, 2022

(30) Foreign Application Priority Data
Jan. 21, 2019  (DE) .................. 10 2019 000 329.2

(51) Int. Cl.
*F16H 1/12* (2006.01)
*F16H 55/17* (2006.01)
(52) U.S. Cl.
CPC ............... *F16H 1/12* (2013.01); *F16H 55/17* (2013.01); *F16H 2055/173* (2013.01)

(58) Field of Classification Search
CPC ...... F16H 1/12; F16H 55/17; F16H 2055/173; F16H 1/145; F16H 57/0025
See application file for complete search history.

(56) References Cited

U.S. PATENT DOCUMENTS

| | | | |
|---|---|---|---|
| 2,974,534 A * | 3/1961 | Clickner | A01K 89/0102 74/416 |
| 4,528,862 A * | 7/1985 | Goldowsky | F16H 57/12 74/440 |
| 8,578,817 B2 | 11/2013 | Hubert | |
| 9,157,507 B2 * | 10/2015 | Zimmermann | F16H 57/025 |

(Continued)

FOREIGN PATENT DOCUMENTS

| | | |
|---|---|---|
| DE | 10057836 A1 | 5/2002 |
| DE | 10103090 A1 | 7/2002 |

(Continued)

OTHER PUBLICATIONS

International Search Report issued in corresponding International Application No. PCT/EP2020/025007, dated Mar. 9, 2020, pp. 1-3, English Translation.

*Primary Examiner* — Terence Boes
(74) *Attorney, Agent, or Firm* — Carter, Deluca & Farrell LLP

(57) ABSTRACT

A geared motor includes a pinion connected to a shaft in a positive manner. A pinion tooth system of the pinion meshes with a tooth system of a gear wheel. In relation to the axis of rotation of the gear wheel, the contact region between the pinion and the shaft radially overlaps, e.g., truly overlaps, with the meshing region, e.g., the tooth system with the pinion tooth system.

18 Claims, 2 Drawing Sheets

(56) References Cited

U.S. PATENT DOCUMENTS

| | | | |
|---|---|---|---|
| 9,184,644 B2 | 11/2015 | Bernhard et al. | |
| 2006/0163882 A1* | 7/2006 | Brandt | F03D 9/11 |
| | | | 290/44 |
| 2014/0137683 A1* | 5/2014 | Hayes | F16H 55/17 |
| | | | 74/434 |
| 2014/0260726 A1 | 9/2014 | Atar et al. | |
| 2019/0152053 A1* | 5/2019 | Xiong | B25J 9/102 |

FOREIGN PATENT DOCUMENTS

| | | |
|---|---|---|
| DE | 10312941 A1 | 12/2004 |
| DE | 102004054601 A1 | 6/2005 |
| DE | 102009005344 A1 | 8/2010 |
| DE | 102014007818 A1 | 12/2015 |
| EP | 3165796 A1 | 5/2017 |
| EP | 3208493 A1 | 8/2017 |
| JP | 2005233055 A | 9/2005 |
| WO | 0171220 A1 | 9/2001 |
| WO | 2007089039 A1 | 8/2007 |

* cited by examiner

GEARED MOTOR

FIELD OF THE INVENTION

The present invention relates to a geared motor.

BACKGROUND INFORMATION

Certain conventional geared motors are equipped with a motor which drives a gear unit that has at least one gear step.

German Patent Document No. 100 57 836 describes a drive for flaps in gas-conducting tubes of combustion engines.

German Patent Document No. 10 2009 005 344 describes a geared motor.

German Patent Document No. 103 12 941 describes an assembly set for a model series of geared motors.

German Patent Document No. 101 03 090 describes a drive unit for gates.

U.S. Patent Application Publication No. 2014/0260726 describes a multipurpose actuator.

German Patent Document No. 10 2014 007 818 describes a drive unit for production technology.

German Patent Document No. 10 2004 054 601 describes a compact drive.

SUMMARY

Example embodiment of the present invention provide a geared motor that may have a long service life.

According to example embodiments of the present invention, a geared motor includes a pinion connected to a shaft in a positive manner, and a pinion tooth system of the pinion meshes with a tooth system of a gear wheel, e.g., in relation to the axis of rotation of the gear wheel, the contact region between the pinion and the shaft radially overlaps, e.g., truly overlaps, with the meshing region, e.g., the tooth system with the pinion tooth system, and/or in relation to the axis of rotation of the gear wheel, the radial clearance range covered by the contact region overlaps with the radial clearance range covered by the tooth system such that the greatest radial clearance of the contact region is smaller than the greatest radial clearance of the tooth system.

A true overlap means that the associated cut-set of the regions not only has a single point, e.g., contact point, but a subregion, e.g., an infinite number of points in mathematical terms.

The radial direction relates to the axis of rotation of the gear wheel so that the axial direction is aligned in parallel with this axis of rotation, and the circumferential direction is the circumferential angle about this axis of rotation. Radial clearances are therefore clearances from this axis of rotation.

This has the advantage that the meshing region reaches radially farther outward than the contact region. Thus, the pinion does have a lower load-carrying capacity in this radially outer region, but the pinion pin protection and the coverage are improved. The pinion thus has a collar- or bell-type extension which lengthens the meshing region in the radially outward direction. The wall thickness of this extension measured, e.g., in relation to the axis of rotation of the gear wheel in the rotational axis direction of the gear wheel decreases monotonically as the radial clearance increases. This allows for an ever greater coverage, e.g., in line with the increase in the axial clearance between the axis of rotation of the gear wheel and the axis of rotation of the shaft. In addition, greater elasticity of the pinion in the radial clearance range radially covered by the extension is achieved, which means that jerks, e.g., also meshing jerks, during the operation of the gear unit are able to be absorbed and the wear of the tooth system and/or the pinion tooth system is able to be reduced, which means that a long service life is achievable.

According to example embodiments, the axis of rotation of the gear wheel is aligned perpendicular to the axis of rotation of the shaft. This makes it possible to obtain a bevel-gear system.

According to example embodiments, the axis of rotation of the gear wheel is set apart from the axis of rotation of the shaft, and thus a non-vanishing axial offset exists in the gear system that includes the gear wheel and pinion. This has the advantage that the gear step formed by the gear wheel and the pinion driven by the motor is a Spiroplan gear step, a spiroid gear step, or a crown gear step.

According to example embodiments, a free space between the pinion and the shaft radially overlaps with the tooth system in relation to the axis of rotation of the gear wheel. This offers the advantage that the pinion is extended by a collar or in the shape of a bell. Despite a lower load-carrying capacity in this region of the extension, better coverage is therefore achieved and thus a longer service life as a result of reduced wear.

According to example embodiments, the radial clearance range covered by the tooth system in relation to the axis of rotation of the gear wheel overlaps with the radial clearance range covered by a free space situated between the pinion and the shaft. This has the advantage that the pinion is extended by a collar or in the shape of a bell. Thus, despite the reduced load-carrying capacity in this region of the extension, better coverage and a longer service life are therefore achieved as a result of the reduced wear.

According to example embodiments, the radial clearance range covered by the contact region in relation to the axis of rotation of the gear wheel abuts the radial clearance range covered by a free space situated between the pinion and the shaft in relation to the axis of rotation of the gear wheel. This offers the advantage that the bell-shaped extension provides elastic cushioning of engagement jerks due to its thin wall thickness and thereby reduces the wear of the gear teeth.

According to example embodiments, the free space terminates in the environment in the end region of the pinion facing away from the gear wheel. This is considered advantageous insofar as elastic cushioning is achieved.

According to example embodiments, a region of the pinion in the shape of an inner cone restricts the free space, and a concave region of the shaft in the shape of a body of revolution, e.g., in the shape of an outer cone, restricts the free space, e.g., the rotation-symmetric axis of the concave region in the shape of a body of revolution and the region in the shape of an inner cone in each case being the axis of rotation of the shaft, e.g., being identical therewith. This offers the advantage that shaft steps can be reduced or made smaller and the risk of a shaft fracture thus is reduced.

According to example embodiments, a region of the pinion in the shape of an inner cone restricts the free space, and a cylindrical region of the shaft restricts the free space, e.g., in the axial direction in relation to the axis of rotation of the gear wheel. This offers the advantage that the pinion is elastic in the radially outer region and therefore able to cushion jerks.

According to example embodiments, a region of the pinion that includes a region in the shape of an inner cone and an adjacent cylindrical region restrict the free space in the axial direction, and a region of the shaft that includes a concave region in the shape of a body of revolution and an adjacent cylindrical region restrict the free space counter to the axial direction. This has the advantage that the free space no contact between this extension region and the shaft takes place, e.g., at the radially outer end, even when the bell-shaped extension region oscillates. According to example embodiments, the tooth system is a Spiroplan tooth system, a spiroid system, or a crown gear. This is considered advantageous insofar as a high torque is transmittable.

According to example embodiments, the gear wheel has a hollow-cylindrical base body, the tooth system being situated on a side of the gear wheel, e.g., as a plane tooth system. For example, a cone-shaped hub region is pre-molded and/or situated on the side of the gear wheel axially facing away from the tooth system in relation to the axis of rotation of the gear wheel. This is considered advantageous insofar as the pinion is able to project radially far inward without any obstruction.

According to example embodiments, the radial clearance range covered by the tooth system is set apart from the axis of rotation of the gear wheel. This is considered advantageous insofar as it allows for an uncomplicated production.

According to example embodiments, the shaft is a rotor shaft of a converter-fed three-phase motor, the shaft being arranged as one part or as multiple parts. This has the advantage that the tooth system and the pinion tooth system achieve a long service life. This is because the converter has a mains-fed rectifier for generating a unipolar voltage from which an inverter is supplied which is operated in a pulse-width-modulated manner. Thus, a current having a higher-frequency current ripple, i.e., fluctuations in the current intensity, is applied to the stator fed by the inverter. This current ripple leads to corresponding fluctuations in the rotational speed of the shaft so that the tooth system and the pinion tooth system are stressed accordingly. However, because of the extension, greater pinion lug protection coverage is achieved. In particular, the edge region of the tooth system and the meshing region of the pinion tooth system are more resilient with regard to the shock loads related to the rotational speed fluctuations.

Further features and aspects of example embodiments of the present invention are described in greater detail below with reference to the appended schematic Figures.

DETAILED DESCRIPTION

Figure 1:
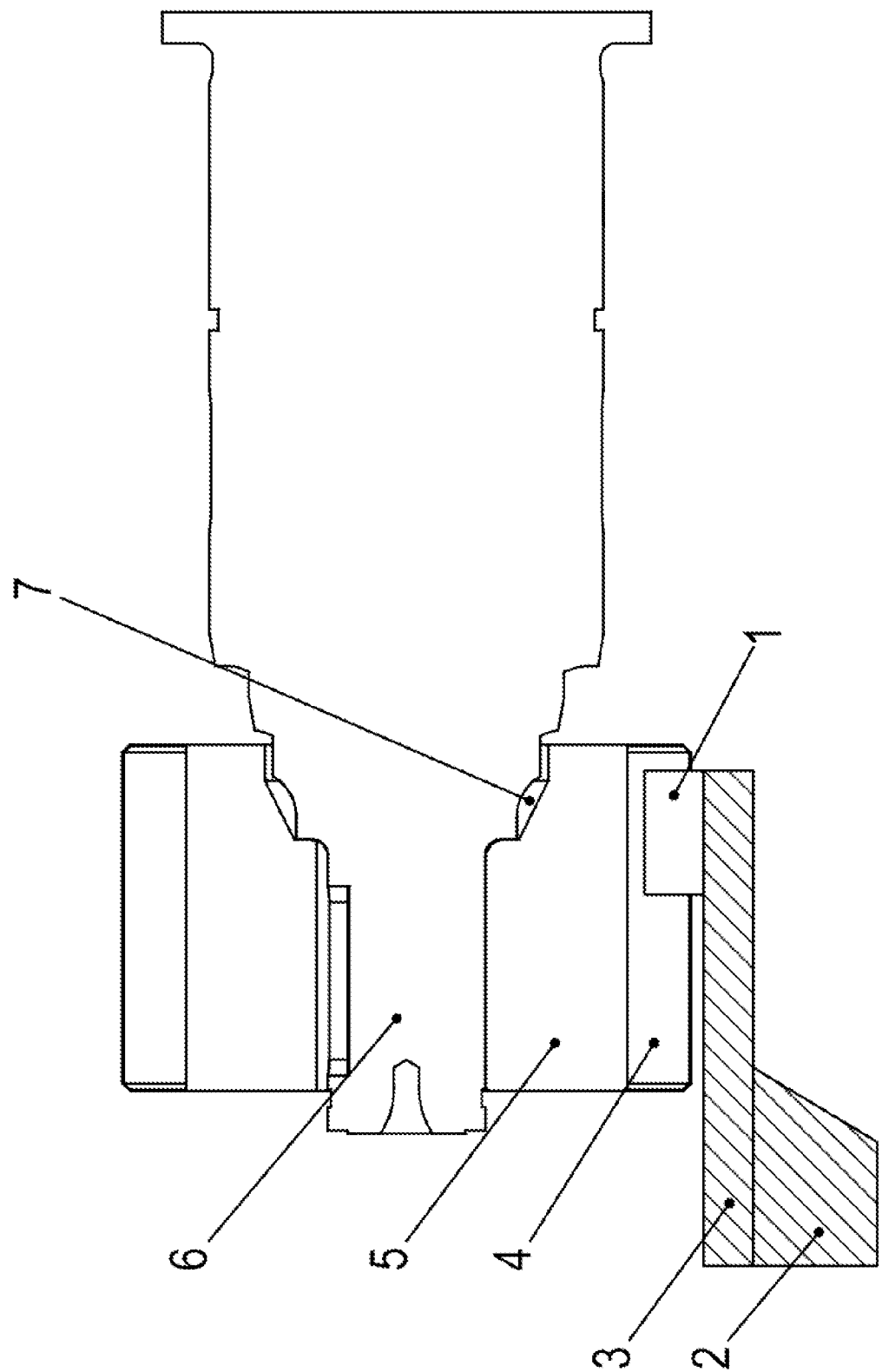
FIG. 1 is a schematic cross-sectional view through an input step of a geared motor according to an example embodiment of the present invention.

As schematically illustrated in FIG. 1, the geared motor has a shaft 6, e.g., a rotor shaft of the electric motor of the geared motor. This shaft 6 includes, e.g., multiple parts.

Placed on top of an axial end region of shaft 6 is a pinion 5, which has a pinion tooth system 4 that is implemented as an external tooth system. Pinion 5 is connected to shaft 6 in a torsionally fixed manner, e.g., in a positively engaged manner, e.g., with the aid of a feather-key connection.

The pinion tooth system meshes with tooth system 1 of a gear wheel (1, 2, 3) whose axis of rotation is aligned perpendicular to the axis of rotation of shaft 6. In addition, the axis of rotation of the gear wheel (1, 2, 3) is set apart from the axis of rotation of shaft 6.

Tooth system 1 of the gear wheel (1, 2, 3) is arranged as a plane tooth system 1, e.g., as a Spiroplan tooth system, a spiroid tooth system, or as a crown gear.

The gear wheel (1, 2, 3) has a hollow-cylindrical base body on whose side facing pinion 5 a tooth system 1 is situated. In relation to the axis of rotation of the gear wheel (1, 2, 3), tooth system 1 covers a first radial clearance range which is included by a second radial clearance range covered by pinion tooth system 4. Viewed from the direction of tooth system 1, i.e., in relation to the axis of rotation of the gear wheel (1, 2, 3), this second radial clearance range thus has a greater extension, both radially inward and radially outward, than the first radial clearance range.

High pinion lug protection and also coverage are therefore achieved.

However, in the radially outer region in relation to the axis of rotation of pinion 5, pinion 5 does not have the same load-carrying capacity as in the radially inner region. This is because pinion 5 touches shaft 6 only in a region that lies radially farther inward in relation to the axis of rotation of pinion 5.

Shaft 6 accommodates pinion 5 in a contact region that reaches only up to a maximum radial clearance in relation to the axis of rotation of the gear wheel (1, 2, 3). In relation to the axis of rotation of the gear wheel (1, 2, 3), this radial clearance is situated within the first radial clearance range covered by tooth system 1, and thus particularly also within the second radial clearance range.

In relation to the axis of rotation of the gear wheel (1, 2, 3) radially above this largest radial clearance, no further contact exists between pinion 5 and shaft 6 despite the pinion as a whole also covering larger radial clearances, i.e., radial clearances above the greatest radial clearance.

Thus, a free space 7, which terminates in the environment, is formed above the greatest radial clearance of the contact region between pinion 5 and shaft 6 in relation to the axis of rotation of the gear wheel (1, 2, 3).

The radial clearance range covered by free space 7 in relation to the axis of rotation of the gear wheel (1, 2, 3) overlaps with the radial clearance range covered by pinion tooth system 4.

As schematically illustrated in FIG. 1, in relation to the axis or rotation of the gear wheel (1, 2, 3), free space 7 is axially restricted by pinion 5 on the one hand and by shaft 6 on the other hand. Shaft 6 is arranged as a concave body of revolution section in this region, and pinion 5 has a section in the shape of an inner cone in this region, which is adjoined by a section in the shape of an inner cylinder. The concave body of revolution section is situated closer to the axis of rotation of the gear wheel (1, 2, 3) than the section in the shape of an inner cylinder.

Therefore, it is particularly situated radially farther inward in relation to the axis of rotation of the gear wheel (1, 2, 3).

The rotation-symmetric axis of the concave body of revolution section and of the section in the shape of an inner cone is aligned in parallel with the axis of rotation of shaft 6.

The axial width of free space 7 thus initially increases monotonically, e.g., not strictly monotonically, as the radial clearance becomes larger until a maximum is reached and then it decreases again monotonically, e.g., not strictly monotonically, until it has a non-vanishing value at the outlet to the environment.

A cylindrical section, e.g., a section in the shape of an outer cylinder, adjoins the concave body of revolution section on shaft 6, which radially overlaps with the section of the gear wheel (1, 2, 3) in the shape of an inner cylinder in relation to the axis of rotation of the gear wheel (1, 2, 3).

According to exemplary embodiments, free space 7 is shaped such that the cylindrical section of shaft 6 with the section of pinion 5 in the shape of an inner cylinder, e.g., so that better support and a better load-carrying capability are achievable.

Figure 2:
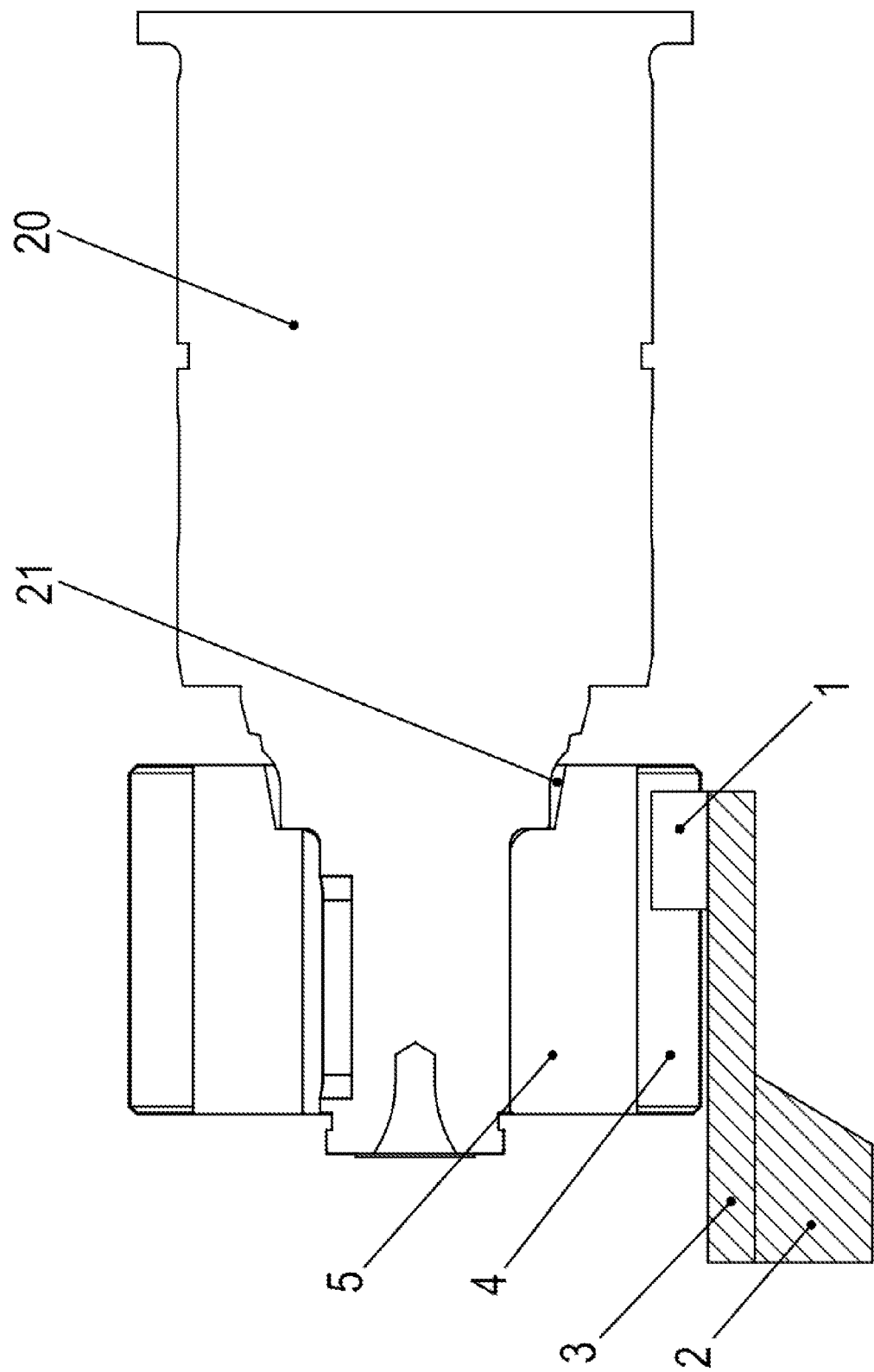
FIG. 2 is a schematic cross-sectional view through an input step of a geared motor according to an example embodiment of the present invention.

In contrast to FIG. 1, in the exemplary embodiment schematically illustrated in FIG. 2, free space 21 is restricted by a cylindrical instead of a conical region of shaft 20. In the radial clearance range covered by this cylindrical region in relation to the axis of rotation of the gear wheel (1, 2, 3), pinion 5 has a region in the shape of an inner cone so that the clear width of free space 21 measured in the axial direction, i.e., in parallel with the axis of rotation of the gear wheel (1, 2, 3), initially increases strictly monotonically in the radial direction and then decreases strictly monotonically on account of a concave body of revolution section on shaft 6 that abuts the cylindrical region of shaft 6.

According to exemplary embodiments, shaft 6 includes a single part rather than of multiple parts.

LIST OF REFERENCE NUMERALS

1 tooth system
2 hub region
3 base body
4 pinion tooth system
5 pinion
6 shaft, e.g., a multipart shaft
7 free space, clearance range
20 shaft
21 free space, clearance range

The invention claimed is:

1. A geared motor, comprising: a gear wheel including a tooth system; a shaft; a pinion positively connected to the shaft and including a pinion tooth system meshing with the tooth system of the gear wheel; wherein a contact region between the pinion and the shaft overlaps, in a radial direction relative to an axis of rotation of the gear wheel, with a meshing region of the tooth system of the gear wheel and the pinion tooth system, and/or a radial distance range of the contact region between the pinion and the shaft overlaps, relative to the axis of rotation of the gear wheel, with a radial distance range of the tooth system of the gear wheel; wherein a greatest radial extent of the contact region is smaller than a greatest radial extent of the tooth system of the gear wheel; wherein a free space between the pinion and the shaft radially overlaps with the tooth system of the gear wheel in relation to the axis of rotation of the gear wheel; and wherein a region of the pinion in a shape of an inner cone restricts the free space, and a concave region of the shaft in a shape of a body of revolution and/or in the shape of an outer cone restricts the free space.

2. The geared motor according to claim 1, wherein the axis of rotation of the gear wheel is arranged perpendicular to an axis of rotation of the shaft, and/or the axis of rotation of the gear wheel is set apart from the axis of rotation of the shaft.

3. The geared motor according to claim 2, wherein a non-vanishing axial offset exists in as gear unit that includes the gear wheel and the pinion.

4. The geared motor according to claim 1, wherein the radial distance range of the tooth system of the gear wheel relative to the axis of rotation of the gear wheel overlaps with a radial distance range of a free space arranged between the pinion and the shaft relative to the axis of rotation of the gear wheel.

5. The geared motor according to claim 1, wherein the radial clearance range covered by the contact region relative to the axis of rotation of the gear wheel abuts a radial clearance range covered by a free space arranged between the pinion and the shaft relative to the axis of rotation of the gear wheel.

6. The geared motor according to claim 1, wherein the free space terminates in the environment in an end region of the pinion facing away from the gear wheel.

7. The geared motor according to claim 1, wherein a rotation-symmetric axis of the concave region in a shape of a body of revolution and the region in a shape of an inner cone coincide with the axis of rotation of the shaft.

8. The geared motor according to claim 1, wherein and a cylindrical region of the shaft restricts the free space in an axial direction relative to the axis of rotation of the gear wheel.

9. The geared motor according to claim 1, wherein a region of the pinion that includes a region in the shape of the inner cone and an adjoining cylindrical region restricts the free space in an axial direction, and a region of the shaft that includes the concave region in the shape of the body of revolution and an adjoining cylindrical region restricts the free space counter to the axial direction.

10. The geared motor according to claim 1, wherein the tooth system of the gear wheel includes a spiroid tooth system or a crown gear.

11. The geared motor according to claim 1, wherein the gear wheel includes a hollow-cylindrical base body, and the tooth system of the gear wheel is arranged on a side of the gear wheel.

12. The geared motor according to claim 11, wherein the tooth system of the gear wheel is arranged as a plane tooth system.

13. The geared motor according to claim 11, wherein a cone-shaped hub region is premolded and/or arranged on a side of the gear wheel axially facing away from the tooth system of the gear wheel relative to the axis of rotation of the gear wheel.

14. The geared motor according to claim 1, wherein the radial distance range of the tooth system of the gear wheel is set apart from the axis of rotation of the gear wheel.

15. The geared motor according to claim 1, wherein the shaft is arranged as a rotor shaft of a converter-fed three-phase motor.

16. The geared motor according to claim 1, wherein the shaft is formed of one part.

17. The geared motor according to claim 1, wherein the shaft is formed of multiple parts.

18. A geared motor, comprising: a gear wheel including a tooth system; a shaft; a pinion positively connected to the shaft and including a pinion tooth system meshing with the tooth system of the gear wheel; wherein a radial distance range of the contact region between the pinion and the shaft overlaps, relative to an axis of rotation of the gear wheel, with a radial distance range of the tooth system of the gear wheel; wherein a greatest radial extent of the contact region is smaller than a greatest radial extent of the tooth system of the gear wheel; wherein a free space between the pinion and the shaft radially overlaps with the tooth system of the gear wheel in relation to the axis of rotation of the gear wheel; and wherein a region of the pinion in a shape of an inner cone restricts the free space, and a concave region of the shaft in a shape of a body of revolution and/or in the shape of an outer cone restricts the free space.

* * * * *